(12) United States Patent
Alizadeh-Khiavi (10) Patent No.: US 12,440,807 B2
(45) Date of Patent: Oct. 14, 2025

(54) SYSTEM AND PROCESS FOR GAS UPGRADING

(71) Applicant: Hydron Energy Inc., North Vancouver (CA)

(72) Inventor: Soheil Alizadeh-Khiavi, North Vancouver (CA)

(73) Assignee: HYDRON ENERGY INC., North Vancouver (CA)

( * ) Notice: Subject to any disclaimer, the term of this patent is extended or adjusted under 35 U.S.C. 154(b) by 0 days.

(21) Appl. No.: 18/558,179

(22) PCT Filed: May 8, 2023

(86) PCT No.: PCT/CA2023/050625
§ 371 (c)(1),
(2) Date: Oct. 30, 2023

(87) PCT Pub. No.: WO2023/215973
PCT Pub. Date: Nov. 16, 2023

(65) Prior Publication Data
US 2024/0238722 A1      Jul. 18, 2024

Related U.S. Application Data

(60) Provisional application No. 63/340,268, filed on May 10, 2022.

(51) Int. Cl.
*B01D 53/96* (2006.01)
*B01D 53/04* (2006.01)
(Continued)

(52) U.S. Cl.
CPC ......... *B01D 53/62* (2013.01); *B01D 53/0438* (2013.01); *B01D 53/96* (2013.01); *B01D 2257/504* (2013.01); *B01D 2257/7025* (2013.01)

(58) Field of Classification Search
None
See application file for complete search history.

(56) References Cited

U.S. PATENT DOCUMENTS 5,387,406 A * 2/1995 Ruoff ..................... B01D 53/10
                                                         422/177
8,900,347 B2   12/2014 Boulet et al.
(Continued)

FOREIGN PATENT DOCUMENTS

DE   102009056660 A1 *   6/2011   ......... B01D 53/1406
SU        1239447 A2 *   6/1986   ................. F22B 1/18

*Primary Examiner* — Daniel Berns
(74) *Attorney, Agent, or Firm* — Palmer IP Inc.

(57) ABSTRACT

A process for purifying a mixed gas stream by physisorptive and chemisorptive gas separation under ambient pressure conditions using competing physical and chemical surface reactions between the gas mixture species and an active or functionalized mesoporous or microporous material by guiding the gas mix over the media on multiple passes. The process comprises providing a feed stream and adsorbing at least one component from said feed stream to generate an intermediate product stream, providing a regeneration stream and displacing the at least one component to generate a purified exhaust stream, and admitting the intermediate product stream to reactivate the adsorbent material and further purify the intermediate product stream.

8 Claims, 8 Drawing Sheets

(51) Int. Cl.
*B01D 53/26* (2006.01)
*B01D 53/62* (2006.01)
*B01D 53/82* (2006.01)

(56) References Cited

U.S. PATENT DOCUMENTS

| | | |
|---|---|---|
| 8,940,072 B2 | 1/2015 | Boulet et al. |
| 9,146,035 B2 | 9/2015 | Boulet |
| 10,174,943 B2 | 1/2019 | Boulet |
| 11,014,040 B2 | 5/2021 | Boulet et al. |
| 11,117,088 B2 | 9/2021 | Boulet et al. |
| 11,148,094 B2 | 10/2021 | Boulet et al. |
| 11,224,834 B2 | 1/2022 | Boulet et al. |
| 11,766,634 B2 | 9/2023 | Khiavi |
| 2013/0152787 A1 | 6/2013 | Boulet et al. |
| 2019/0126190 A1 | 5/2019 | Boulet et al. |
| 2021/0354085 A1 | 11/2021 | Khiavi |

\* cited by examiner

SYSTEM AND PROCESS FOR GAS UPGRADING

FIELD

Certain aspects of the present disclosure generally relate to a gas upgrading process for selectively separating a target gas from a multicomponent gas/fluid mixture and related systems. More particularly, the present invention relates to methods for purifying hydrogen or methane, carbon monoxide, or a mixture of them by adsorptive gas separation from all remaining gases of a gas mixture.

BACKGROUND

The production and use of syngas and biogas have become increasingly popular in municipal, industrial, and agricultural applications. These are mixtures of hydrogen or methane and carbon dioxide, carbon monoxide, and small quantities of other gases produced from fossil or biological sources. The composition of these streams varies depending upon the origin of the gas.

The goal of a gas purification processes is to selectively separate various target gases or components found in a gas source stream, such as hydrogen, methane and carbon dioxide, and carbon monoxide, and to enable the use or capture of the purified components in other applications. The conventional separation processes used in the field typically rely on applying large variations of a certain parameter or property (such as pressure, temperature, or concentration) in order to achieve separation. These processes are therefore very energy intensive and result in high operating costs. Exemplary conventional gas purification processes for removing carbon dioxide from fuel streams utilize large gas compressors, require significant equipment to generate vacuum conditions, and use additional equipment for pre-treatment and post-treatment of the inlet gas or component output stream. Further, as desired component purity may not be achieved, additional product polishing and/or tail gas treatment installations and processes are necessary in order to achieve desired output component purity.

Figure 1:
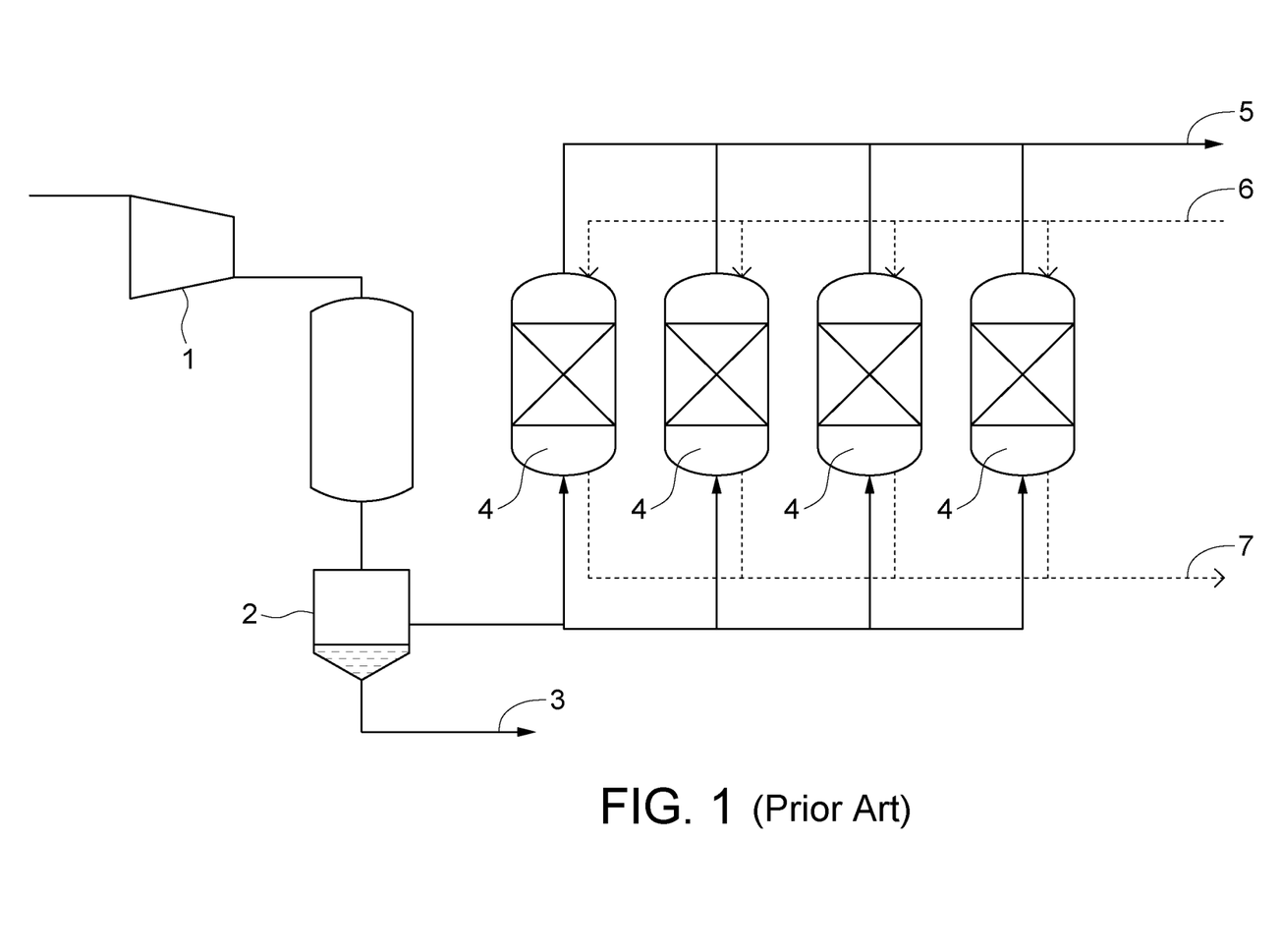
FIG. 1 shows a block diagram illustrating the process of a prior art gas upgrading system.

FIG. 1 illustrates a process cycle block diagram of an exemplary prior art gas upgrading process. A condenser 1 feeds gas into a storage tank which then undergoes a gas conditioning process 2 in order to eliminate condensate 3, and is fed to multiple pressure swing adsorption (PSA) columns 4, in order to generate an upgraded gas stream 5. Separately, a purge gas stream 6 is fed into the PSA columns 4 to regenerate the adsorption media, and is discarded as a waste gas stream 7.

In addition, conventional processes require large areas for plant installations, which further increase the necessary capital cost for equipment and real estate. Conventional technologies typically employ small granules of beaded adsorbents contained in large pressure vessels to prevent the adsorbent granules from becoming buoyant, which imposes a limit on how fast conventional process can be carried out and the resulting throughput of these conventional processes.

A further limitation of prior art gas purification or separation processes relates to the stream components available for use. When purifying a combustible component from a feed stream, care must be taken to avoid generating combustible mixtures. For example, prior art processes that use air cannot be used to purify a fuel stream.

Therefore, there is a need for a gas upgrading process which offers improved energy efficiency, a smaller operational footprint, and a faster overall cycle time with a high purity and capture recovery of the target gases or components over existing technologies.

SUMMARY

Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a gas upgrading and purification process and system to provide improved energy efficiency by eliminating the need for high pressure ratio compression or vacuum, reduced operational footprint by eliminating the need for pressure vessels, compressors, vacuum pumps, and pre/post treatment unit operations, and increased yield through reduced cycle time over existing processes and systems, while maintaining high purity and capture recovery of the target or component gases. The described system in addition offers a scalable solution for use in a broad range of applications.

Another aspect of the present disclosure provides a gas upgrading and purification system for separating at least a first component and a second component from a multi-component fluid mixture, comprising at least one adsorbent contactor chamber, which further comprises at least one adsorbent material, a first port and a second port. In embodiments, the gas upgrading and purification system is fluidly connected to selectively admit the multi-component fluid mixture as at least a portion of a feed stream into the first port of at least one contactor chamber, to adsorb at least a portion of the second component on the at least one adsorbent material in at least one contactor chamber, and fluidly connected to selectively recover an intermediate product stream comprising the at least first component and second component from the second port of at least one contactor chamber. The gas upgrading and purification system may also be fluidly connected to selectively admit a first regeneration stream comprising at least a third component into the second port of at least one contactor chamber to displace or desorb at least a portion of the second component on the at least one adsorbent material, producing an exhaust stream comprising the at least second component, and fluidly connected to selectively recover said exhaust stream from the first port of at least one contactor chamber. The gas upgrading and purification system may also be fluidly connected to selectively admit the intermediate product stream comprising the at least first component and second component as a reactivation stream in the first port of the at least one contactor chamber to further adsorb at least a portion of the remaining second component in the intermediate product stream and to displace or desorb at least a portion of the third component of the regeneration stream on the at least one adsorbent material, and fluidly connected to selectively recover a final product stream from the second port of at least one contactor chamber.

Another aspect of the present disclosure provides steady state cyclic process for purifying a mixed component fluid stream, comprising the steps of receiving a feed stream comprising at least a first component and a second component, such that the feed stream flows in a first direction relative to a contactor structure and contacts a chemically or physically active material on or incorporated in the contactor to sorb at least a portion of said second component to provide a first product stream depleted in said second component relative to said feed stream; and receiving a regenerative stream comprising at least a third component, such that the regenerative stream flows in a second direction relative to the contactor structure generally opposite to said first direction and contacts and chemically or physically interacts with the active material to displace at least a portion of said second component to provide an exhaust stream enriched in said second component relative to said first component and regenerative stream.

Another aspect of the present disclosure provides a system for purifying a mixed component fluid stream, comprising a contactor having a chemically active or physically sorptive material, at least a first controllable stream flow control structure and a second controllable stream flow control structure operable to selectively provide a fluid stream and output a fluid stream such that the stream selectively flows in either a first direction or a second generally opposite direction relative to the contactor a sorbent media therein, wherein the stream flow control structures are further selectively connectable to admit fluid streams from different fluid sources, and a controller coupled to control the at least first and second controllable stream flow control structures, the controller controlling the stream flow control structures to sequentially provide streams from different sources and to selectively control the fluid flow in either the first direction or the second direction.

Another aspect of the present disclosure provides system for purifying a mixed component fluid stream, comprising a first controllable stream flow control structure and a second controllable stream flow control structure each operable to selectively provide a fluid stream to a sorptive region and receive a fluid stream from the sorptive region, wherein the stream flow control structures are further selectively connectable to receive fluid streams from different fluid sources and provide output streams. The system also comprises contactor having a sorptive material configured in said sorptive region, and a first stream fluid flow path coupled to a first input of the first stream flow control structure and to a feed stream fluid source, wherein the first stream flow control structure is operable to provide a stream flow patch from the first stream fluid flow path to the sorptive region and output to the second stream flow control structure. The system also comprises a second fluid flow path coupled to a first output of the second stream flow control structure and to a second input of the first stream flow control structure, and a third fluid flow path coupled to a first input to the second stream flow control structure and to a regenerative stream fluid source, wherein the second stream flow control structure is operable to provide a stream flow path from the third fluid flow path to the sorptive region and output to the first stream flow control structure. The first stream flow control structure is operable to provide a stream flow path from the second fluid flow path to the sorptive region and output to the second stream flow control structure.

Another aspect of the present disclosure provides a gas upgrading and purification process requiring only the treatment of a component feed stream and steam generation means for obtaining a high purity of at least a first and second component, with a recovery rate of 99.9% for a first component and 99% for a second component.

DETAILED DESCRIPTION

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein can be embodied by one or more elements of a claim.

Although aspects are described herein, many variations and permutations of these aspects fall within the scope of the disclosure. Although some benefits and advantages of the preferred aspects are mentioned, the scope of the disclosure is not intended to be limited to benefits, uses, or objectives. The detailed description and drawings are merely illustrative of the disclosure rather than limiting.

Biomethane, also known as renewable natural gas or RNG is a near-pure source of methane produced by upgrading biogas by purifying, drying and removing any carbon dioxide ($CO_2$) or other contaminants present in the biogas. Biomethane is indistinguishable from natural gas and can therefore be used without the need for any changes in transmission and distribution infrastructure or end-user equipment. It is also fully compatible for use in natural gas vehicles.

In a related area, the need for pure hydrogen has also increased. Hydrogen fuel cells have raised the demand on environmentally sustainable and friendly sources for hydrogen. Currently, most hydrogen is produced by the reforming of methane in natural gas, a process with high carbon dioxide emissions. This hydrogen is known as gray hydrogen. When this process is upgraded to include processes for carbon capture and reduced emissions, the obtained hydrogen is known as blue hydrogen, promoted as a low emissions solution. With increasing recognition of the impact of excess carbon in the environment as well as mounting regulatory requirements, carbon capture is an area of interest for many industries.

The present disclosure includes a novel raw gas upgrading and purifying system and process. The system utilizes a multi-swing process to selectively separate a target gas or component, and thereby purify a first component, such as hydrogen and/or methane, by selectively separating these gases from all remaining gases and components in the feed stream. The term multi-swing process is used to describe a process where more than one parameter, such as pressure or temperature as used in conventional systems, is varied. For example, a multi-swing process is a process where both the concentration of a gas or component within a gas stream is varied, and the temperature of the stream is varied. In the disclosed system and process feed stream gases containing a first component, such as methane or hydrogen, pass through a chamber, while a second component, such as carbon dioxide or hydrogen, is adsorbed from the feed stream. The adsorbed second component, such as carbon dioxide, is later released when a higher temperature regeneration media, such as low-grade steam, gaseous water stream or water in gaseous form, is applied to the adsorbent. The process for separating a target gas or first component comprises the steps of feed production, regeneration, and reactivation or purification, where intermediate streams are used in one or more feedback loops as further described below.

One of the advantages of the disclosed system and process is that the process operates under atmospheric conditions, and therefore extreme pressures are not required. In addition, the entire process is substantially isobaric, as pressure swings are not required. As a result, the conventional equipment necessary for achieving these extreme pressures is not required either. The energy requirements for operation are therefore also reduced. The operation of the disclosed system and process requires steam generation, which can be achieved either through external heater(s) or through the use of recaptured heat, further reducing operational energy requirements. The disclosed system is also advantageous as faster cycles are possible since the adsorbent beds are solid and not small beads as in conventional technologies. In addition, the system is advantageously scalable, and can be applied for example to very large 20,000 $NM^3/h$ refinery applications, down to small 20 $NM^3/h$ micro plants.

An additional advantage of the disclosed system and process is that a separate or secondary gas polishing process or tail gas treatment is not required, as the quality of the output product stream is already sufficient or greater than necessary for subsequent use. Since an additional polishing stage is not required for obtaining an output stream, further cost, time and operational energy requirements are achieved.

Figure 2:
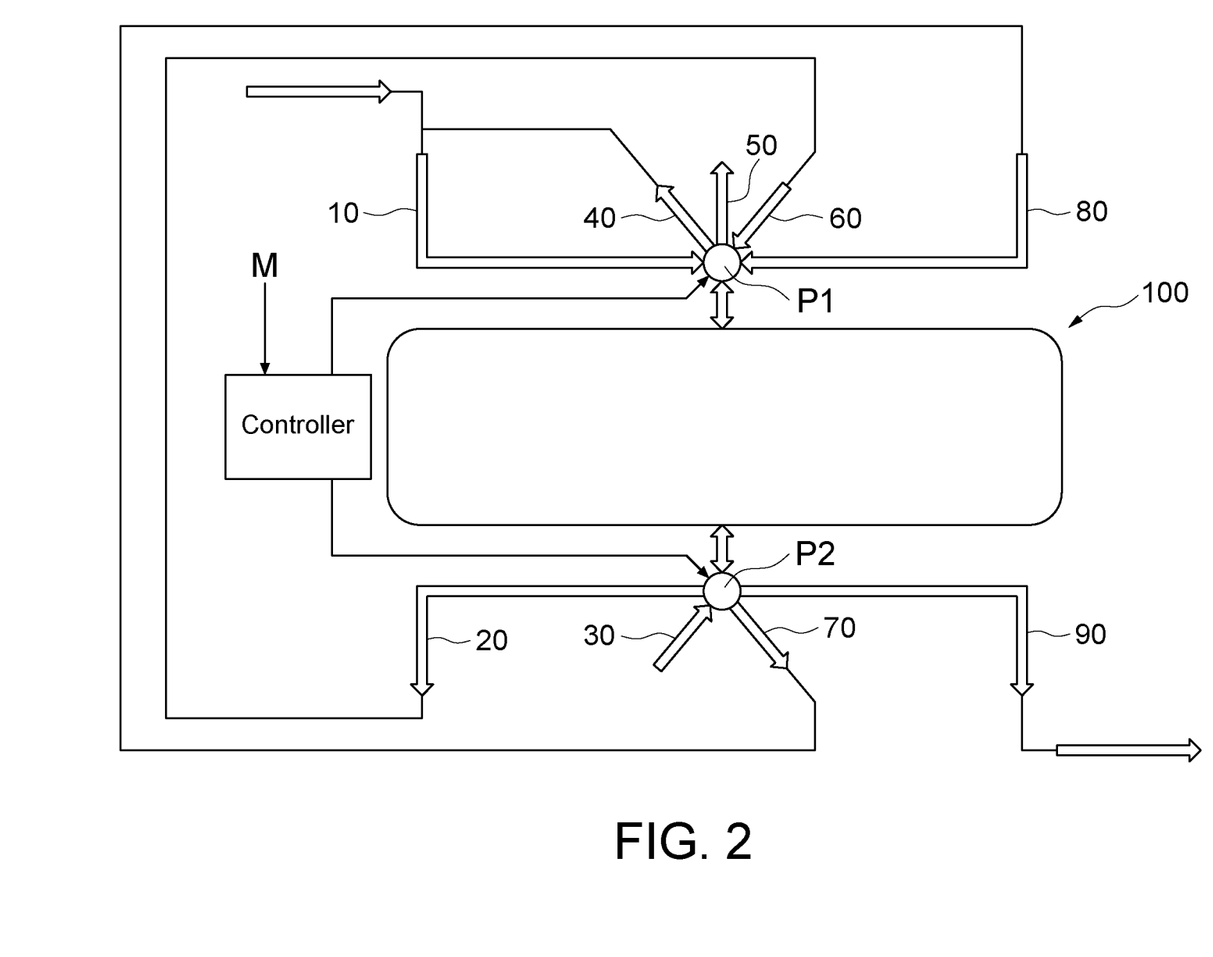
FIG. 2 shows a block diagram illustrating the gas upgrading system and process according to one aspect of the present disclosure.
Figure 4:
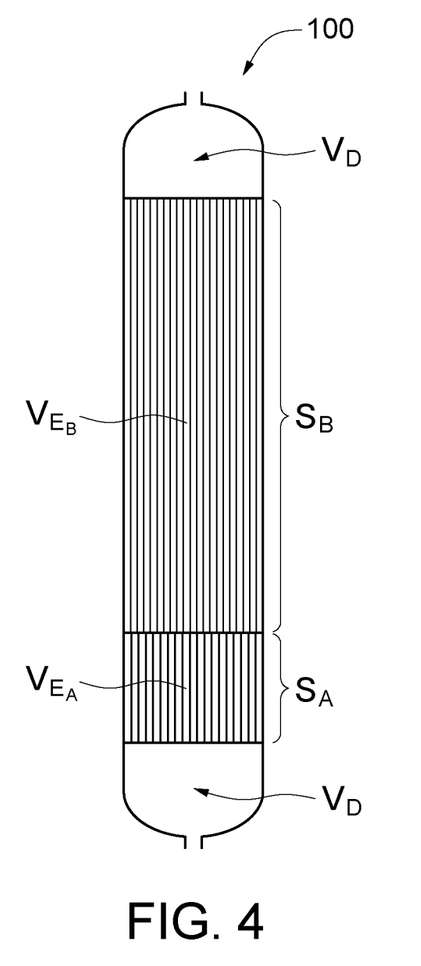
FIG. 4 illustrates a chamber used in an embodiment of the gas upgrading system according to one aspect of the present disclosure.

FIG. 2 illustrates a block diagram illustrating the gas upgrading system and process according to one aspect of the present disclosure. A general chamber 100 is depicted with selectable bi-directional fluid component ports P1 and P2 for selectively providing and receiving gaseous input and output streams as required for the described process. Each of controllable ports P1 and P2 may comprise a single structure or plural separate structures. Ports P1 and P2 may be respectively coupled to first and second openings in the chamber housing such as illustrated in FIG. 4 or each may be coupled to multiple openings of the housing. Also, various combinations of single or plural structure Ports P1, P2 and single or multiple openings are possible based on implementation size, cost and other factors. Suitable structures for flow control may include electrically controlled valves or other electrically controlled actuators, pipe fittings or other fluid conduits with couplings to the fluid streams as illustrated in FIG. 2 and in more detail in FIG. 7. A number of variations in the specific structure or structures comprising ports P1 and P2 are possible while providing the desired flow control. Although a contact chamber 100 with a housing is illustrated in FIG. 4 which supports the contactor (or substrate or bed), incorporating a chemically or physically active material, hereinafter referred to as sorptive material an external shell or chamber is not needed for support to maintain contactor rigidity, since the contactor itself may preferably comprise an immobilized material providing structural rigidity. Therefore, a chamber as illustrated may be replaced with a suitable structure bounding the desired flow path over the substrate while allowing controllable flow in opposite directions relative to the substrate. Therefore, the term port as used herein is not limited to a structure configured in an opening but may include any structure providing directional control of the flow of a fluid stream over a contactor wherever configured. Therefore, for clarity the term stream flow control structure may be employed herein for the structures comprising ports P1 and P2 without limiting the scope of the term port. The system further comprises a controller system configured to control one or more of the components of the gas purification system, and configured to control the gas purification process as described herein. The controller may include one or more processors, distributed at one or more locations. As used herein, the controller system is generally referred to as controller. The controller is configured to receive one or more input signals M. The selectable bi-directional fluid component ports P1 and P2 can be controlled by the controller to select the fluid stream that is admitted or recovered from said ports as described for the gas purification system and process as disclosed. As used herein, the selectable fluid ports P1 and P2 are generally referred to as an entrance and an exit, but it should be understood that either one of the entrance or the exit can be used as a bi-directional fluid port for both providing an input gaseous component stream to the chamber or for receiving an output gaseous component stream from the chamber.

The chamber further includes equally spaced and immobilized parallel sheets of adsorbent media, defining parallel passages therebetween, as described above. In embodiments, the active surface area of the adsorbent is an amine polymer material. The totality of the adsorbent is collectively referred to as the adsorbent bed (not shown). The gas upgrading system illustrated in FIG. 2 implements a process flow described below. The process preferably comprises the steps of Feed production step A, Regeneration step B, and Reactivation step C. During each step, gas streams 10, 20, 30, 40, 50, 60, 70, 80 and 90 are selectively provided or extracted at the bi-directional fluid component ports, as depicted by block arrows entering or leaving the chamber 100.

While a single chamber 100 is illustrated and described, it should be understood that multiple chambers 100 can be included in the system, and can carry out the process as described herein using a time staggered approach. For example, one or more chambers 100 can be configured to carry out the Feed production step A of the disclosed process, while one or more additional chambers 100 can be configured to simultaneously carry out the Regeneration step B of the disclosed process, and while one or more additional chambers 100 can be configured to simultaneously carry out the Reactivation step C of the disclosed process. In this manner, gas streams produced during one step of the process can be fed directly to a separate step of the process. Also, the gas sorption inside of single contactor bed may be controlled by compartmentalizing the sorptive media to allow multiple passes over various segments of the bed in order to achieve fractionalization of the complex mixture of gas. Such a segmented contactor bed is illustrated in FIG. 4 discussed below. Alternatively, or in combination, storage tanks can be used to store the content of gas streams, as further described with reference to FIG. 7.

Figure 3:
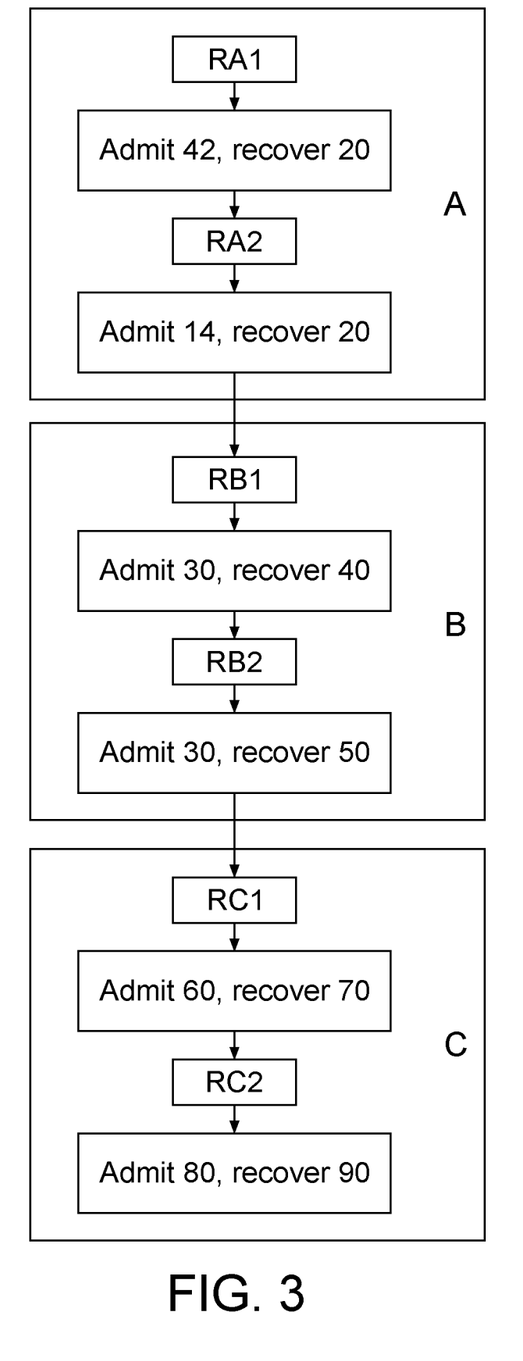
FIG. 3 illustrates a flow diagram of the gas upgrading process according to one aspect of the present disclosure.

FIG. 3 illustrates a flow diagram of the gas upgrading and purification process according to one aspect of the present disclosure. In embodiments, the gas upgrading and purification process comprises a Feed production step A which includes a step RA1 for configuring first and second ports of at least one adsorbent contactor chamber for admitting a recycle stream 42 and recovering intermediate product stream 20, and a step RA2 for configuring first and second ports of at least one adsorbent contactor chamber for admitting a feed stream 10 and recovering intermediate product stream 20 from the at least one chamber. Afterwards, the process comprises a Regeneration step B which includes a step RB1 for configuring first and second ports of at least one adsorbent contactor chamber for admitting a regeneration stream 30 and recovering a recycle out stream 40, and a step RB2 for configuring first and second ports of at least one adsorbent contactor chamber for admitting a regeneration stream 30 and recovering an exhaust stream 50 from the at least one chamber. Afterwards, the process comprises a Reactivation step C which includes a step RC1 for configuring first and second ports of at least one adsorbent contactor chamber for admitting a drying stream 60 and recovering a drying out stream 70 or product stream 90, and in embodiments a step RC2 for configuring first and second ports of at least one adsorbent contactor chamber for admitting a cooling stream 80 and recovering an output product stream 90. It should be understood that the described process can be carried out simultaneously on multiple chambers using a time staggered approach as described with respect to FIG. 2.

FIG. 4 schematically illustrates an embodiment of the gas upgrading system and process according to one aspect of the present disclosure. The system includes a chamber 100 containing a porous adsorbent media in the form of preferably equally spaced and immobilized parallel sheets to form parallel fluid flow passage contactors. The chamber has fluid access ports. An adsorbent contactor comprises one or more adsorbent media segments, illustrated in this embodiment by $S_A$ and $S_B$, with substantially parallel fluid flow passages oriented in an axial direction and comprising cell walls situated between each adjacent one of said fluid flow passages. Each cell wall comprises at least two opposite cell wall surfaces, and additionally comprising at least one adsorbent media compound. The one or more adsorbent media segments may comprise different adsorbent media. The dimensions of the cell walls and the parallel fluid flow passages are optimized and configured to provide a high surface area to low volume ratio for the parallel fluid flow passage contactors, while minimizing the flow resistance of the component streams through the chamber. A void volume or interstitial volume, illustrated in this embodiment by $V_{E_A}$ and $V_{E_B}$, and collectively referred to as $V_E$, is the volume within each segment, including the fluid flow passages. In embodiments, the void volume comprises 30% to 50% of the total volume of each segment.

A dead volume $V_D$ is further defined at each end of chamber 100. In embodiments, the dead volume $V_D$ comprises 3% to 30% of the chamber volume. In embodiments, the dead volume $V_D$ is minimized, in order to avoid the additional steps in the process, as described in detail further below. The dead volume $V_D$ is neutral and non-reactive to the plurality of fluid streams admitted to the chamber 100, in that components of the fluid stream are not adsorbed or desorbed within this volume.

The chamber 100 includes at least first and second fluid access ports through which gas streams are selectively admitted to and recovered from, after traversing through the parallel passages of the adsorbent media $S_A$ and $S_B$. The gases and components contact the media and react with the adsorbent media. The system described in the present disclosure can act upon any raw gas stream containing methane, carbon dioxide, water, and or hydrogen, and is not limited to receiving biogas or natural gas.

Figure 5:
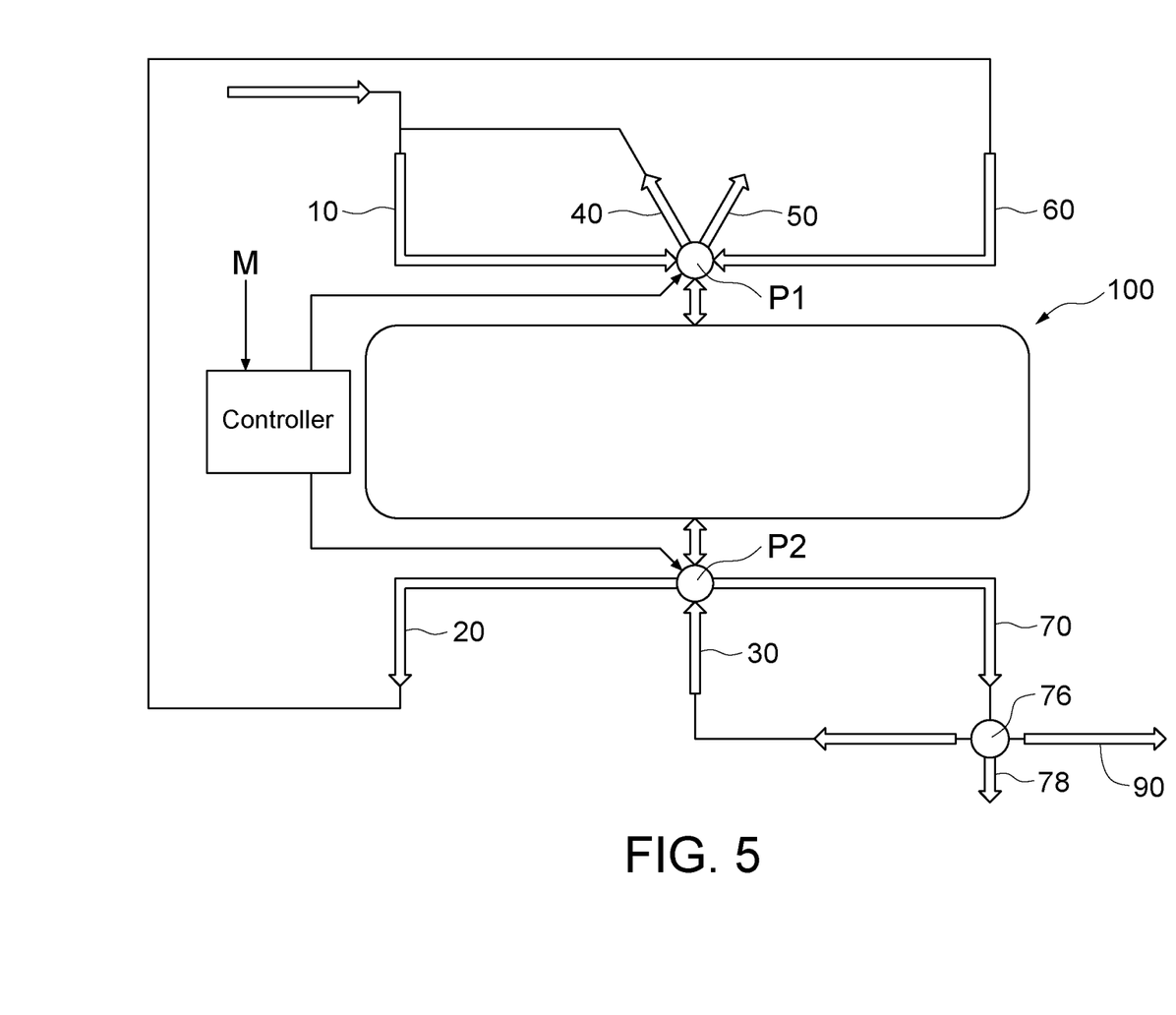
FIG. 5 shows another block diagram illustrating the gas upgrading system and process according to one aspect of the present disclosure.

With reference to FIG. 5, another block diagram illustrating the gas upgrading system and process according to one aspect of the present disclosure is shown. The gas purification system includes a general chamber 100 with selectable bi-directional fluid component ports P1 and P2 for selectively providing and receiving gaseous input and output streams. The system further comprises a controller as described with respect to FIG. 2. The selectable bi-directional fluid component ports P1 and P2 can be controlled by the controller. Similar to the system and process described in FIG. 2, the gas upgrading system illustrated in FIG. 5 implements the steps of Feed production stage A, Regeneration stage B. and Reactivation stage C. During each step, gas streams 10, 20, 30, 40, 50, 60, and 70 are selectively provided or extracted at the bi-directional fluid component ports P1 and P2, as depicted by block arrows entering or leaving the chamber 100. During the Reactivation step C, a single stream 60 is received to produce an output stream 70, which is selectively fed into a condenser 76 to remove condensates 78 contained in stream 70 and produce an output product stream 90. Therefore, the Reactivation step C comprises providing a single stream to chamber 100. It should be understood that the described process can be carried out simultaneously on multiple chambers using a time staggered approach as described with respect to FIG. 2.

Figure 6A:
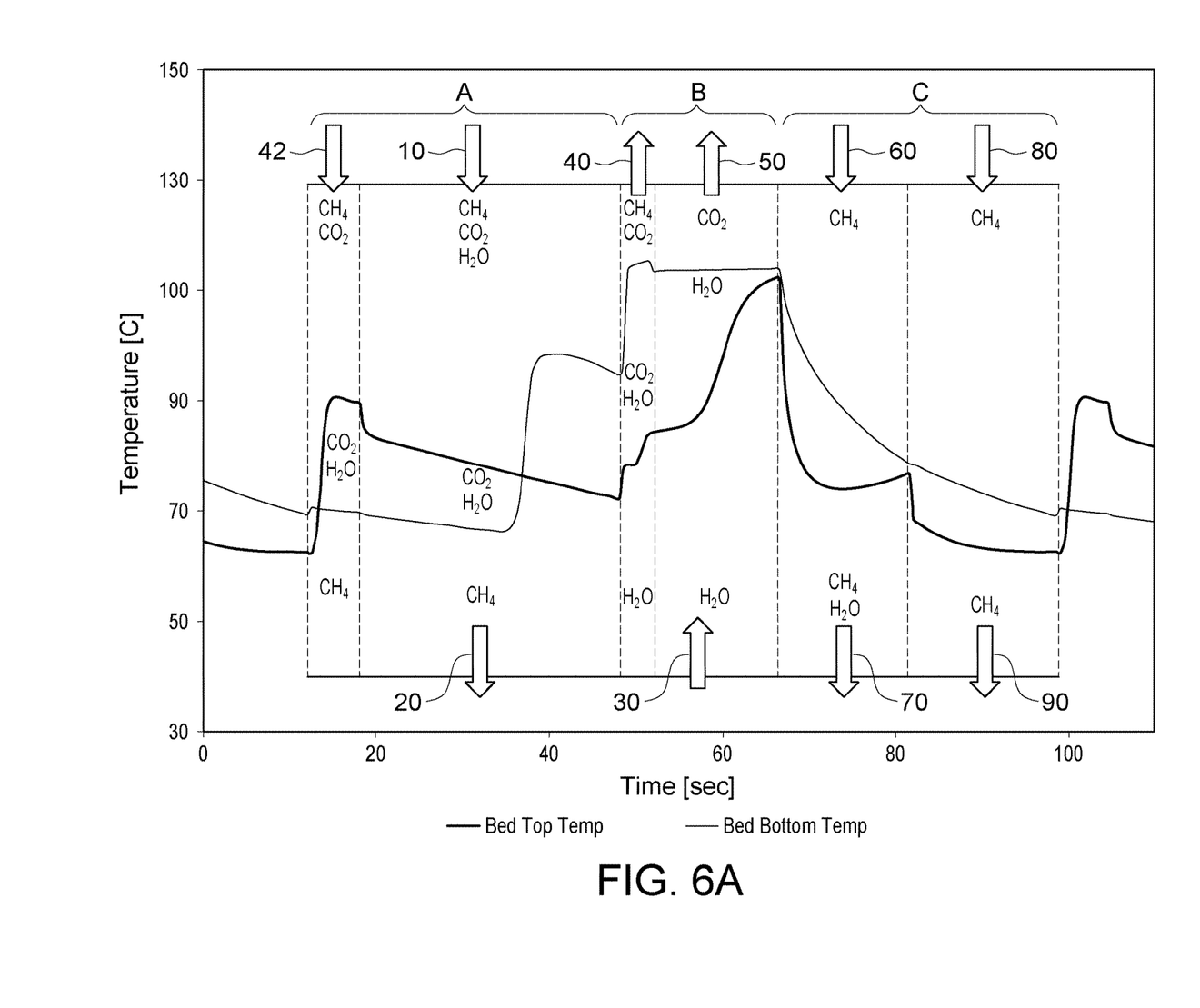
FIG. 6A illustrates an exemplary process cycle temperature profile example according to one aspect of the present disclosure.

With reference to FIG. 6A, an exemplary process cycle temperature profile according to one aspect of the present disclosure is illustrated. One exemplary cycle of operation is illustrated, where the horizontal axis denotes the time and the vertical axis corresponds to the temperature within the chamber at the entrance fluid port (thick line) and at the exit fluid port (thin line). Each of the steps of the process are indicated as separate regions along the horizontal axis. The input streams into the chamber and output streams out of the chamber at each step are indicated by arrows, using the same reference numbers as in FIG. 2.

Figure 7:
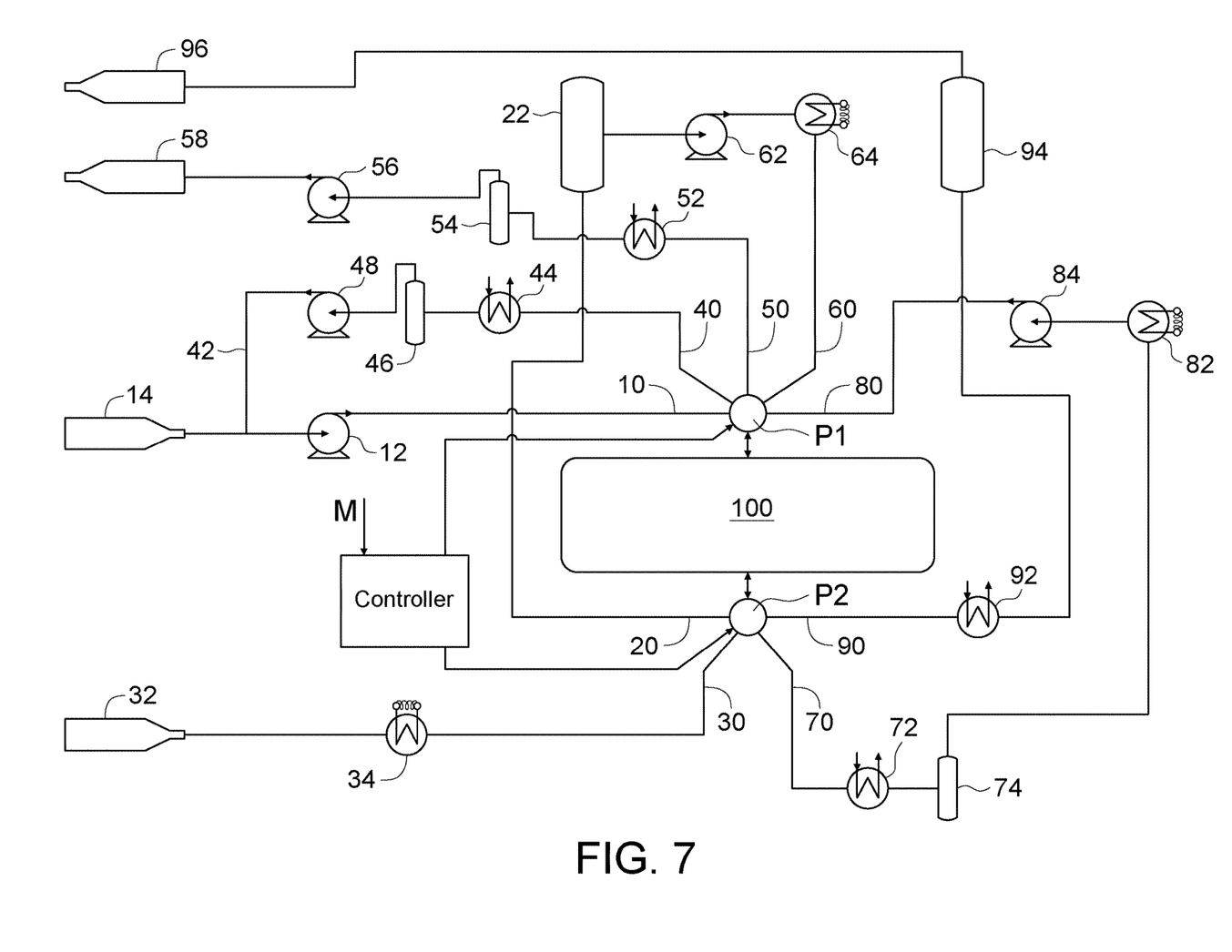
FIG. 7 illustrates an exemplary block flow diagram of the gas upgrading system according to one aspect of the present disclosure.

With further reference to both FIG. 2, FIG. 6A and FIG. 7, during the Feed production step A, a total feed or biogas feed stream 10 is fed into the entrance port of the chamber. The total feed stream 10 comprises an input or source stream 14 and a recycle in stream 42. The streams described herein are in suitable pipes or other known conduits, ducts or lines adapted to transport said streams. The streams structurally may be referred to herein as flow paths. The input stream is also referred to as an input gas stream, raw fuel gas, or unpurified fuel. The input stream can include, but is not limited to, fresh raw fuel gas, such as syngas, fresh biogas, landfill gas, or digester gas. The components of total feed stream 10 can include but are not limited to methane ($CH_4$), water ($H_2O$), and carbon dioxide ($CO_2$). The components of the total feed stream 10 can further include hydrogen ($H_2$), nitrogen ($N_2$), oxygen ($O_2$) and other elements and compounds. The temperature of the total feed stream 10 is generally at ambient temperature. The total feed stream 10 is at near atmospheric pressure. In embodiments, the temperature of the total feed stream 10 is between 30° C. and 40° C. In embodiments, the total feed stream 10 comprises only the recycle in stream 42 (as further illustrated in FIG. 7), which is fed into the chamber for approximately 5 seconds. In embodiments, stream 42 comprises the components contained within the void volume $V_E$ and dead volume $V_D$ of a separate chamber 100 at the end of a Feed step A, and at the beginning of a Regeneration step B, before the components in stream 30 have fully filled and displaced the void volume $V_E$ and dead volume $V_D$ within the separate chamber 100. Afterwards, the total feed stream 10 can comprise a combination of the recycle in stream 42 and the input gas stream, which is fed into the chamber for approximately 30 seconds.

The total feed stream 10 is made to flow through the adsorbent bed within the chamber. The system and process as disclosed herein delivers a product throughput of 5 to 10% per volume of sorbent at every cycle, at process rates of about 1-2 Cycles Per Minute. The regeneration energy is calculated by the mass ratio of water content in the gaseous water stream (including but not limited to water vapor or steam) to the pure product stream which is described as the ratio of regeneration fluid mass comprising a third component to final product fluid mass comprising a first component. In embodiments, the disclosed system and process as disclosed provides a mass ratio of water to methane of 0.5. Cycle steps may be pre-determined and fixed for a given process based on the optimization simulations and testing. The specific timing of individual process steps, A, B, C for example, may change as well as the overall timing of the repetition of the A, B, C cycles. Such overall timing may be referred to herein as frequency or cycle speed. The individual cycle timing as well as cycle speed are preferably based on P, T, C (Pressure, Temperature, Composition of gas) measurements for a specific substrate and sorptive material.

In embodiments, the sorbent media can be comprised of physical sorbents, such as but not limited to activated carbon, activated alumina, silica gel, zeolites, and metal-organic frameworks (MOFs). In embodiments, the sorbent media can be comprised of chemical sorbents, such as but not limited to amine doped activated carbon, amine doped activated alumina, amine doped mesoporous silica, amine grafted zeolites, amine grafted MOFs, and amino polymers such as amino polystyrene. In embodiments, the active surface area of the adsorbent is an amine polymer material that chemically reacts with carbon dioxide and water, to form a carbonate (carbonic acid).

A layer with a thickness of a single molecule of carbon dioxide is formed on the surface of the adsorbent by selective physical and chemical affinity of carbon dioxide and water molecules with the adsorbent media. As a result, a first component of the gaseous stream, such as hydrogen or methane, flows through the parallel passages of the adsorbent media while a second component, such as carbon dioxide or water, is adsorbed by the media. During the adsorption process, the temperature of the media increases. Heat is transferred to the remaining transiting gases. A hot product stream 20 leaves the chamber 100 through the exit fluid port. In embodiments, an exemplary product stream 20 comprises mainly methane gas with a concentration above 95%.

During this sorption process, the temperature of the media increases and heat is transferred to the remaining transiting gases. During approximately the first 3 to 5 seconds of a process cycle when the total feed 10 comprises mainly the recycle in stream 42 as described above, the temperature of the adsorbent media within the chamber 100 and adjacent to the entrance port increases at an approximate rate of 10 C/s (degrees Celsius per second), while the temperature of the adsorbent media within the chamber 100 and adjacent to the exit port remains substantially constant as illustrated in FIG. 6A. During the remainder of the Feed step A, the temperature of the media at the entrance port decreases at a rate of approximately −0.3 C/s. During this same time, the temperature of the media at the exit port decreases at a similar rate, until approximately 15 seconds later, when the temperature increases at a rate of approximately 10 C/s for about 3 seconds, and then remains substantially constant. This "temperature step" initiates at the adsorbent media adjacent the entrance port as the components of the total feed stream 10 react with the media, and this "temperature step" propagates through the layers of adsorbent media as these layers react to the components of the gaseous stream traversing the media. FIG. 6A illustrates the delay of the "temperature step" at the exit port with respect to the entrance port. The heat from the media is transferred to the transiting gases, generating the hot product stream 20.

In the Regeneration step B, the direction of flow of the gas streams is reversed. A steam feed 30 is fed into chamber 100 through the exit port. The steam feed 30 can comprise pure water steam or other high-water concentration gas mixture such as low-quality steam, or any ambient condensable fluid, or a blend of water in gaseous phase with other vapors or gas components, including for examples nitrogen, carbon dioxide, or an inert gas, or combinations thereof. The steam feed 30 is applied to the adsorbent bed at the exit port and made to traverse the media, replacing, displacing or desorbing the second component, such as carbon dioxide, from the adsorbent bed. Step B regenerates the media by having water molecules react with the active sites of the adsorbent media and substituting the single molecule layer of the second component by means of a chem-adsorption process, such as carbon dioxide, and pushing the second component out of the media. This process generates further heat in the adsorbent bed. A stream comprising hot gas comprising the at least second component leaves the chamber through the entrance fluid port.

During an initial period of the Regeneration B step lasting approximately 5 seconds, a recycle out stream 40 is collected out of the entrance of the chamber 100, in order to collect the first component contained within the void volume $V_E$ and the dead volume $V_D$ of chamber 100. This is done in order to improve the efficiency of the capture rate by first purging any remaining components of stream 10 within chamber 100, prior to collecting exhaust stream 50 as described below. The recycle out stream 40 may have a higher concentration of a first component, such as methane or hydrogen, and a lower concentration of a second component, such as carbon dioxide, during this initial period due to the residual feed stream from the previous step contained within the chamber void volume and/or dead volume, as previously described. The purity or concentration of a component of the enriched gas produced in this step varies throughout the Regeneration B step. The recycle out stream 40 can be combined with the total feed stream 10 as the recycle in stream 42 in step Feed A. The temperature of the adsorbent media adjacent the exit port increases at a rate of approximately 20 C/s for 2-3 seconds, and then remains substantially constant throughout the remainder of the step. The temperature of the media adjacent the entrance port increases at a rate of approximately 5 C/s for approximately 5 seconds.

After the initial period of Regeneration step B, where the steam feed 30 has been continuously supplied to the adsorbent bed for approximately 5 seconds, an exhaust stream 50 containing a concentrated second component is collected out of the entrance of the chamber 100. The temperature of the adsorbent media adjacent the exit port remains substantially constant throughout this step, while the temperature of the media adjacent the entrance fluid port increases at rates ranging from 1 to 3 C/s. The concentrated second component desorbed from the adsorbent bed, such as carbon dioxide, provides high quality, concentrated gas which can be collected for subsequent use in various applications, such as recapture. At the end of step B, the adsorbent media within the chamber is saturated with the third component.

In the Reactivation step C, the adsorbent media is restored to its original condition. At least one drying stage is carried out to purge water and moisture from the adsorbent media bed. At least one cooling stage is carried out to reduce the temperature of the adsorbent media, which is achieved by desorptive cooling as the second component is desorbed from the media. A further function of this step is to further adsorb any remaining second component within the drying and cooling streams admitted to the chamber, to further purify the product stream comprising the first component by depleting said second component. After Reactivation step C has been carried out, the entire gas purification process can be repeated.

In step C, drying stream 60 and cooling stream 80 are sequentially fed into the entrance fluid port of chamber 100. Both drying stream 60 and cooling stream 80 comprise a heated first component, such as methane, which is used to remove the water from the media. The drying stream 60 and/or cooling stream 80 comprise mainly recirculated or feedback component streams, as further described below. In embodiments, the Reactivation C step includes multiple drying cycles. In embodiments, the Reactivation C step includes multiple cooling cycles.

At the beginning of step C during the drying stage, drying in stream 60 is fed into the chamber through the entrance fluid port. The drying in stream 60 comprises a recirculated product stream 20 which has been heated. The product stream 20 can be heated using regenerative heaters (see FIG. 7) that use the energy contained in the exhaust stream 50 and drying out stream 70 collected from other beds (not shown). The product stream 20 can also be heated using an external heater (not shown). The drying in stream 60 is fed to the gas upgrading system to reactivate the adsorbent bed by purging the residual moisture and lowing the bed temperature, while further purifying the fluid stream as it traverses the media. Trace amounts of second gas components, such as carbon dioxide, from the recycled and heated product gas stream 20 are further adsorbed during this drying stage, which enriches the purity of the first component, such as methane, in the resulting output stream at this stage. A drying out stream 70 is collected from the exit fluid port of chamber 100, which primarily contains water and methane.

The temperature of the adsorbent media adjacent the entrance port of chamber 100 rapidly decreases at the beginning of the drying stage, at a rate of approximately −8 to −10 C/s for several seconds, then stabilizes and slowly increases at a rate of approximately 0.5 to 2 C/s during approximately 10 to 15 seconds. The temperature of the adsorbent media adjacent the exit port is reduced at a rate of approximately −2 to −3 C/s. The temperature of the drying in stream 60 is carefully controlled to avoid condensate from being formed in the adsorbent bed from under-heating, or adsorbent degradation from over-heating. In embodiments, the temperature of the at least first component in stream 60 is 95 to 110 degrees C. at the beginning of step C. Further, as step C progresses and the media cools down as described above, the temperature of stream 60 must remain approximately 2 to 5 degrees C. higher than the media. In further embodiments, the temperature of stream 60 is controlled so that it does not exceed 120 to 150 degrees, to avoid damage to the sorbent media.

The drying out stream 70 must be cooled down before further use. This can be achieved, for example, by transferring some of the heat to product streams 20 from other beds (not shown) using regenerative coolers (see FIG. 7) as described above. During this process of cooling drying out stream 70, the moisture contained in stream 70 is separated, resulting in a highly concentrated first gas component, such as methane or hydrogen, which can be stored.

During the cooling stage of Reactivation step C, cooling in stream 80 is fed into the entrance port of chamber 100. Stream 80 comprises the highly concentrated first gas component, such as methane, obtained from gas stream 70. Stream 80 is heated prior to being fed into chamber 100. In embodiments, stream 80 is heated to remain approximately 2 to 5 degrees C. higher than the media. The cooling in stream 80 continues to remove residual moisture and cool down the bed to maximize gas separation efficiency. The remaining trace amounts of a second component in the gas stream, such as carbon dioxide, that are present in the recycled stream 70 are further adsorbed to further increase the purity of the first component in the resulting cooling out stream 90, also referred to as the total product stream. The temperature of the adsorbent media adjacent to the entrance port of chamber 100 during the cooling stage has a rate of change of approximately −10 C/s for 1 to 2 seconds, and then decreases to approximately 0 over approximately 20 seconds. The temperature of the media adjacent the exit port of chamber 100 remains substantially constant at approximately −0.5 to −1 C/s over approximately 20 seconds.

During Reactivation step C, the first component in stream 60 and stream 80, such as methane, acts upon the adsorbent media within the chamber to displace any amount of the third component, such as moisture, which in turn allows the media to adsorb any residual second component, such as carbon dioxide, still found in stream 60 comprising recirculated product stream 20, or stream 80. Therefore, step C acts as a polishing stage, where the second component such as carbon dioxide is removed from the gaseous stream, and a purified first component such methane, remains. As a result, output product stream 90 comprises a very high concentration of the first component, and a separate polishing step is not required.

In embodiments, the drying and cooling stages can be sequentially repeated, in order to further purify the gas components in the streams, and further removing trace amounts of remaining components in the streams. In embodiments, when the sorbent is a chemical sorbent, reactivation step C is carried out at least once. In embodiments, when the sorbent is a physical sorbent, reactivation step C is carried out at least twice. The illustrated process flow example has a number of advantages. In particular, as one example control of the direction of the flow is important for providing desired results. In step B, the flow direction maintains the minimum energy required and avoids condensing water. The heat of reaction of $CO_2$ and material will exit the contactor bed steam is pushed across the contactor at the same direction as the prior desorption step. However, if the steam is introduced in the reverse direction, e.g., when steam is introduced from the product gas exhaust side as illustrated in step B, this preserves the heat bubble adding the heat of reaction of the water to the system to regenerate substantially all $CO_2$ out of the bed. Then it is desired to remove all water out of system without condensing it. Therefore, at step C hot and dry gas is brought in closer to the peak of water uptake, which by this time all has travelled all the way to the feed port. Also, it is desired that the feed end is allowed to cool down so material reaches initial state, therefore the cooling step is also provided from the feed direction as shown in step C stream 80.

Figure 6B:
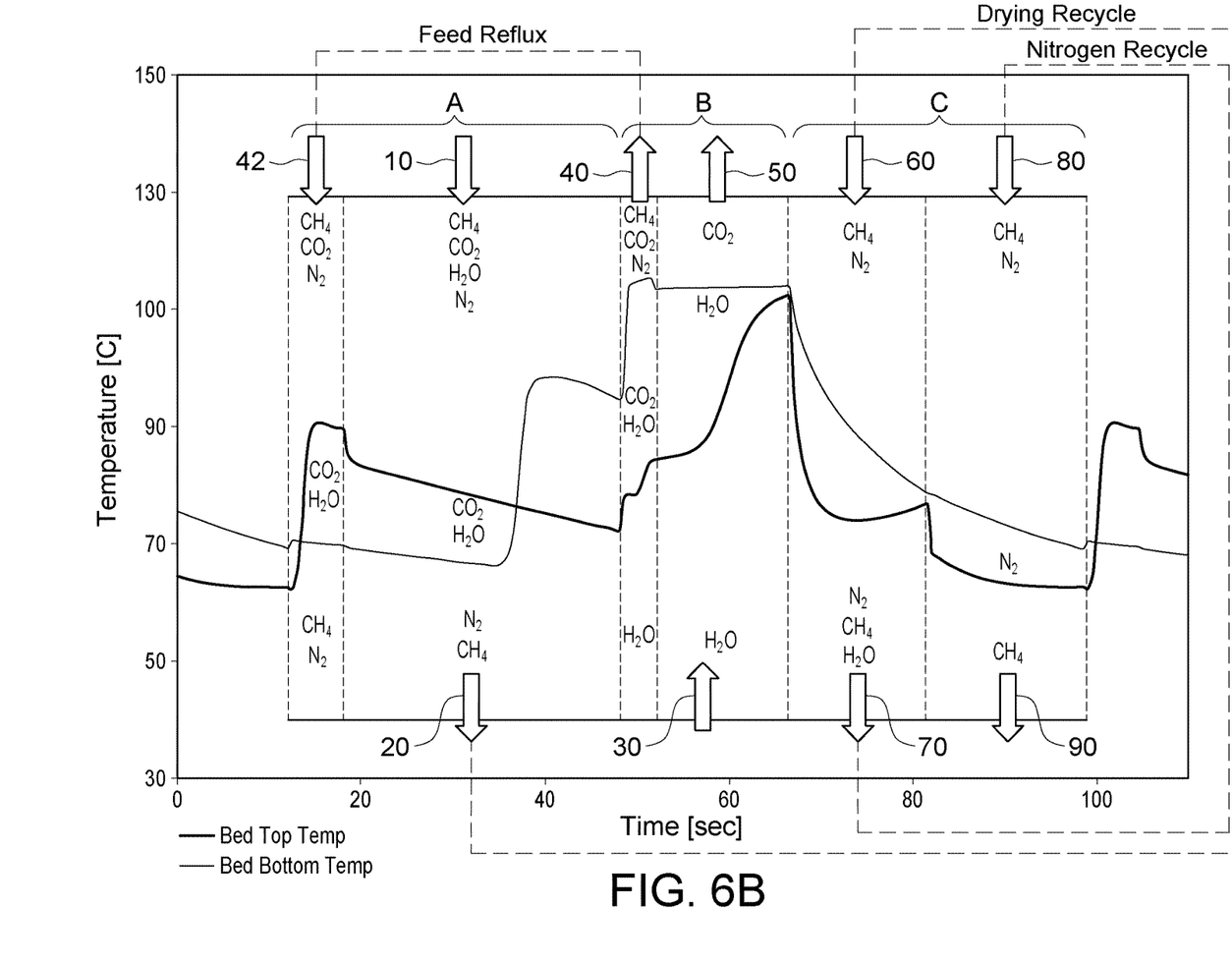
FIG. 6B illustrates another exemplary process cycle temperature profile example according to one aspect of the present disclosure.

With reference to FIG. 6B, an exemplary process cycle temperature profile according to another aspect of the present disclosure is illustrated. Except where noted, the same descriptions as provided for FIG. 2 and for FIG. 6A apply.

In the exemplary embodiment of FIG. 6B, a total feed stream 10 containing a fourth component, such as nitrogen is fed into the entrance port of the chamber. In other embodiments, the fourth component may be other impurities, such as oxygen, for example. The total feed stream 10 comprises an input or source stream 14 containing nitrogen and a recycle in stream 42. An exemplary input stream 14 containing nitrogen is landfill gas. During the Feed step A, feed stream 10 is fed into the entrance port and traverses the media, where carbon dioxide and water are adsorbed by the adsorbent media within the chamber, generating the hot product stream 20 containing at least a first component, such as methane, and nitrogen. During Feed step A, nitrogen is not adsorbed by the media within the chamber because water is present within the media, which blocks the adsorption of the nitrogen by the media.

In the Regeneration step B with respect to FIG. 6B, the direction of flow of the gas streams is reversed, as described with respect to FIG. 6A. A steam feed 30 is fed into chamber 100 through the exit port and made to traverse the media, replacing, displacing or desorbing the second component, such as carbon dioxide, from the adsorbent bed. During the initial period of the Regeneration B step, the gases contained within the void volume $V_E$ and the dead volume $V_D$ of chamber 100, including the first component and nitrogen, generate recycle out stream 40, which leaves the chamber through the entrance fluid port. During the remainder of Regeneration step B, an exhaust stream 50 containing a concentrated second component is collected out of the entrance of the chamber 100. At the end of step B, the adsorbent media within the chamber is saturated with the third component.

In the Reactivation step C, at least one drying stage is carried out to purge the second component which comprises water and moisture from the adsorbent media bed. At least one cooling stage is carried out to reduce the temperature of the adsorbent media, which is achieved by desorptive cooling as the second component is desorbed from the media. Given that the second component is desorbed from the media, any nitrogen in the stream traversing the chamber is adsorbed by the media during the cooling stage, further purifying the gaseous stream. In embodiments, the Reactivation C step includes multiple drying cycles. In embodiments, the Reactivation C step includes multiple cooling cycles.

During the cooling stage of Reactivation step C, cooling in stream 80 is fed into the entrance port of chamber 100. Stream 80 comprises the highly concentrated first gas component, such as methane, obtained from gas stream 70, as well as nitrogen. The remaining trace amounts of a second component in the gas stream, such as carbon dioxide, and nitrogen, that are present in the recycled stream 70 are further adsorbed as the media has an increased capacity to adsorb additional components such as nitrogen when the media is dry. In this manner, total product stream 90 is produced with an increased purity of the first component.

Turning now to FIG. 7, an exemplary block flow diagram depicting the disclosed system implementing a process according to one aspect of the present disclosure is illustrated. During the Feed step A, chamber 100 receives total feed stream 10 through port P1, by means of feed blower 12. The total feed stream 10 comprises a gas feed 14 and a recycle in stream 42. Product stream 20 is received from the chamber 100 through port P2 and directed towards a product storage tank 22, where the partially separated gas is stored. Storage tank 22 can collect product stream 20 from a single chamber 100 or from multiple chambers from multiple process modules using a time staggered approach as described with respect to FIG. 2.

During the Regeneration step B, steam or rinse stream 30 is fed into chamber 100 through port P2. A steam source 32 provides steam, water vapor, or other suitable gas as described above, which is fed into a superheater 34 prior to being fed into chamber 100. During the initial stage of step B, recycle out stream 40 is collected from chamber 100 through port P1, and fed through recycle cooler 44 prior to being collected in a storage tank 46. Recycle out stream 40 comprises the components contained within the void volume $V_E$ and dead volume $V_D$ of chamber 100 at the end of Feed step A, that are displaced by stream 30 as it is fed into chamber 100. In embodiments, stream 40 comprises approximately 80% of a first component. The gas stored in tank 46 can then be fed as the recycle in stream 42 during the Feed step A for chamber 100, or can be used as recycle in stream in a parallel process module. Tank 46 may collect the gas from cooled recycle out streams 40 from a single chamber 100, or from multiple chambers. During the remainder of step B, once the components of stream 30 have filled the void volume $V_E$ and dead volume $V_D$ of chamber 100, an exhaust or waste stream 50 is collected from the chamber through port P1. The exhaust stream 50 is also cooled using exemplary waste cooler 52, and subsequently stored in tank 54. Tank 54 can be configured to collect cooled exhaust stream 50 from one chamber 100 or from multiple chambers in parallel processes. The cooled exhaust gasses in tank 54 can be extracted by means of waste blower 56, and directed to an exhaust route 58 for recapture and storage or subsequent use.

During the first stage of Reactivation step C, stored gas from product stream 20 is extracted from tank 22 by means of blower 62 and heated by heater 64, to be fed into chamber 100 through port P1 as drying in stream 60. Drying out stream 70 is collected from chamber 100 through port P2, and cooled down using cooler 72, prior to being stored in tank 74. Tank 74 can collect the gas from cooled drying out streams 70 from a single chamber 100 or from multiple chambers from multiple process modules. During the second stage of Reactivation step C, the stored gas in tank 74 is heated by means of a heater 82 and fed into chamber 100 through port P1 by means of blower 84 as cooling in stream 80. A total product stream 90 is collected from chamber 100 through port P2, and further cooled by means of cooler 92 prior to being stored in a final product tank 94. The gas collected in tank 94 can be collected from a single chamber 100 or from chambers from multiple process modules. A product stream 96 can then be collected for subsequent use.

One or all of coolers 44, 52, 72 and 92 can be operationally linked to one or all of heaters 34, 64 and 82, as regenerative heaters/coolers. One or all of coolers 44, 52, 72 and 92 extracts heat from corresponding streams, and transfers this heat to one or all of heaters 34, 64 and 82. Such an arrangement allows heat from one step of the process to be used an applied at another stage in the process. Further, one or all of coolers 44, 52, 72 and 92 can be operationally linked to one or all of heaters 34, 64 and 82 from other process modules as regenerative heaters/coolers. Such an arrangement allows heat from one step of the process in one process module to be used or applied in another stage of the process of a separate process module. As a result, overall efficiency is increased.

One or all of the heaters 34, 64 and 82, one or all of the coolers, 44, 52, 72 and 92, one or all of the blowers 12, 48, 56, 62 and 84 and one or all of the selectable bi-directional fluid component ports P can be controlled by a controller in order to achieve the system and process as described.

The disclosed process provides numerous advantages over prior art. One advantage is that the output product stream does not require a separate polishing process, as the component concentration in the gas stream is very high. Therefore, the resulting fluid gas stream which has undergone a two-stage process is a high quality, concentrated product.

A further advantage of the system is that the gaseous water stream, steam or water vapor used during the Regeneration step B without the need for high pressure vapor, and the necessary related equipment. In embodiments a process gas component, or an external or inert gas stream, can be heated by exchanging energy with the compressed product gas, for example compressed renewable natural gas, and then humidified by a mist stream in order to generate a stream that includes gaseous water or water vapor, and a gas component that does not react with the sorbent beds under the process conditions of the current step. In this manner a gaseous stream is generated that delivers water molecules to regenerate the sorbent media and that delivers heat by means of the additional gas component. Advantages if this embodiment include that the gaseous water or water vapor does not have to be heated to high temperatures, further reducing the overall value of energy consumption of the process.

The current disclosure also differs from prior art, which uses air in related reactivation steps. Given that the reactivation process generates a stream of very combustible components, the use of air would create a hazard as it includes oxygen. In the current process, by using a gas stream containing the same first combustible component of the desired final product stream for the Reactivation step C, quality and concentration of the final product streams is increased during the same step in which the reactivation is achieved.

While the foregoing is directed to aspects of the present disclosure, other and further aspects of the disclosure can be devised without departing from the basic scope thereof.

What is claimed is:

1. A steady state cyclic process for purifying a mixed component fluid stream, comprising:
   receiving a feed stream comprising at least a first component and a second component, such that the feed stream flows in a first direction relative to a contactor structure and contacts a chemically active material on or incorporated in the contactor to sorb at least a portion of said second component by chemisorption to provide a first product stream depleted in said second component relative to said feed stream; and
   receiving a regenerative stream comprising at least a third component, such that the regenerative stream flows in a second direction relative to the contactor structure generally opposite to said first direction and contacts and chemically interacts with the active material to sorb at least a portion of said third component by chemisorption and to displace at least a portion of said second component to provide an exhaust stream enriched in said second component relative to said first component and regenerative stream; further comprising recirculating and receiving at least some of said first product stream such that the first product stream flows in said first direction relative to the contactor structure and interacts with the active material to desorb and displace from the chemically active material at least a portion of said third component to regenerate the contactor structure for a subsequent cycle and provide a second product stream, comprising the first component of the first product stream diluted in the third component from the regenerative stream, wherein the first component of the second product stream is concentrated by cooling and condensing the third component.

2. The process according to claim 1, wherein the first component comprises methane, the second component comprises carbon dioxide and the third component comprises water vapor.

3. The process according to claim 1, further comprising recirculating and receiving at least some of said concentrated second product stream such that the second product stream flows in said first direction relative to the contactor structure and contacts the active material to provide a third product stream enriched in said first component relative to said second product stream.

4. The process according to claim 3, wherein the feed stream further comprises a fourth component, at least some of which remains in the third product stream and the process further comprises recycling and receiving the third product stream such that the third product stream flows in said first direction relative to the regenerated contactor structure and contacts the active material to interact with at least a portion of said fourth component to provide a fourth product stream depleted in the fourth component.

5. The process according to claim 1, further comprising conditioning the regenerative stream prior to being received.

6. The process according to claim 1, wherein the contactor structure is configured within one or more chemically active contactor chambers having first and second ports which generally define said product stream flow directions relative to the contactor structure.

7. The process according to claim 1, further comprising recovering a portion of the exhaust stream during a first time interval and recovering a different portion of said exhaust stream during a second time interval.

8. The process according to claim 7, further comprising combining a portion of the exhaust stream recovered during the first time interval with the feed stream.

* * * * *